United States Patent
Merkin et al.

(10) Patent No.: US 7,552,320 B2
(45) Date of Patent: Jun. 23, 2009

(54) ARRANGEMENT FOR INITIATING A RE-IMAGING PROCESS FOR A COMPUTER SYSTEM

(75) Inventors: Aaron E. Merkin, Holly Springs, NC (US); Brandon J. Ellison, Morrisville, NC (US); David B. Rhoades, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 450 days.

(21) Appl. No.: 11/394,653

(22) Filed: Mar. 31, 2006

(65) Prior Publication Data

US 2007/0239626 A1    Oct. 11, 2007

(51) Int. Cl.
*G06F 9/00* (2006.01)
*G06F 1/24* (2006.01)
*G01C 9/00* (2006.01)

(52) U.S. Cl. .................... 713/1; 713/100; 702/150
(58) Field of Classification Search ............. 713/1, 713/100; 702/150
See application file for complete search history.

(56) References Cited

U.S. PATENT DOCUMENTS

| | | | |
|---|---|---|---|
| 5,760,690 A * | 6/1998 | French | 340/571 |
| 5,996,074 A | 11/1999 | Houck et al. | |
| 6,094,720 A | 7/2000 | Cromer et al. | |
| 6,126,327 A | 10/2000 | Bi et al. | |
| 6,151,211 A | 11/2000 | Dayan | |
| 6,170,026 B1 | 1/2001 | Kimura et al. | |
| 6,714,937 B1 | 3/2004 | Eynon et al. | |
| 6,785,805 B1 | 8/2004 | House et al. | |
| 7,159,106 B2 * | 1/2007 | Meaney et al. | 713/2 |
| 7,275,165 B2 * | 9/2007 | Mehta et al. | 713/310 |
| 7,289,102 B2 * | 10/2007 | Hinckley et al. | 345/156 |
| 2004/0266417 A1 * | 12/2004 | Janas | 455/419 |

* cited by examiner

*Primary Examiner*—Thomas Lee
*Assistant Examiner*—Stefan Stoynov
(74) *Attorney, Agent, or Firm*—Ference & Associates LLC

(57) ABSTRACT

An arrangement which eliminates the need to remove a computer system from its packaging in order to initiate a re-imaging process. Particularly, there is broadly contemplated herein the use of a position-sensitive switching arrangement, such as a mercury switch, that is configured to power selected control circuitry in a computer so as to receive additional information or data as needed to update imaging or other aspects of a computer's operating system.

19 Claims, 1 Drawing Sheet

US 7,552,320 B2

ARRANGEMENT FOR INITIATING A RE-IMAGING PROCESS FOR A COMPUTER SYSTEM

FIELD OF THE INVENTION

The present invention relates to computers systems and re-imaging processes therefor, as well as arrangements for initiating and controlling the action of re-imaging processes.

BACKGROUND OF THE INVENTION

Computer system manufacturers generally have standard models for their products. They will also build custom models for customers. These custom models may differ from a standard model only in the hardware configuration or they may have a custom image preloaded unto the system. Frequently, large corporate customers will purchase systems in large blocks, for example 500 or 1000 systems at a time.

These large customers will have service level agreements (SLA agreements) with the manufacturer which set aggressive goals for the turnaround time between order entry and order fulfillment. In order to meet these aggressive goals, the manufacturer will sometimes assemble, image, and package systems in anticipation of an order from the customer. Alternately, a customer may actually place a large order, only to cancel it after fulfillment of the order has begun. In either case, the manufacturer will be left with a number of systems that have been customized for a particular account.

If the customization is limited to hardware configuration, it may be possible for the vendor to sell the system without modification. However, when the customizations include a custom image for a particular client it may be necessary to re-image the system prior to selling it to a different client. This may be necessary because the image is not suited for general use, or because the manufacturer is contractually forbidden from distributing systems with the customer's custom image to anyone but the customer. Re-imaging the system is an expensive and time-consuming process. This cost is primarily driven by the need to remove the system from its packaging, manually power it on, and apply the new image.

Accordingly, a compelling need has been recognized in connection with providing a re-imaging process or arrangement that does not require the convoluted steps just mentioned.

SUMMARY OF THE INVENTION

There is broadly contemplated herein an arrangement which eliminates the need to remove a computer system from its packaging in order to initiate a re-imaging process. Particularly, there is broadly contemplated herein the use of a position-sensitive switching arrangement, such as a mercury switch, that is configured to power selected control circuitry in a computer so as to receive additional information or data as needed to update imaging or other aspects of a computer's operating system.

In summary, one aspect of the invention provides an apparatus for updating a computer operating system of a computer, the apparatus comprising: a wireless interface; control circuitry configured for activating the wireless interface and a boot protocol; a switch configured for activating the control circuitry, the switch being actuable upon an altered positional state of the computer; wherein the control circuitry is further configured for updating at least one aspect of the computer operating system upon actuation of the switch.

Another aspect of the invention provides a method of updating a computer operating system of a computer, the method comprising the steps of: providing a wireless interface; providing control circuitry for activating the wireless interface and a boot protocol; providing a switch configured for activating the control circuitry, the switch being actuable upon an altered positional state of the computer; altering a positional state of the computer and actuating the switch; and updating at least one aspect of the computer operating system upon actuation of the switch.

Furthermore, an additional aspect of the invention provides a program storage device readable by machine, tangibly embodying a program of instructions executable by the machine to perform method steps updating a computer operating system of a computer, the method comprising the steps of: providing a wireless interface; providing control circuitry for activating the wireless interface and a boot protocol; providing a switch configured for activating the control circuitry, the switch being actuable upon an altered positional state of the computer; altering a positional state of the computer and actuating the switch; and updating at least one aspect of the computer operating system upon actuation of the switch.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE INVENTION

Figure 1:
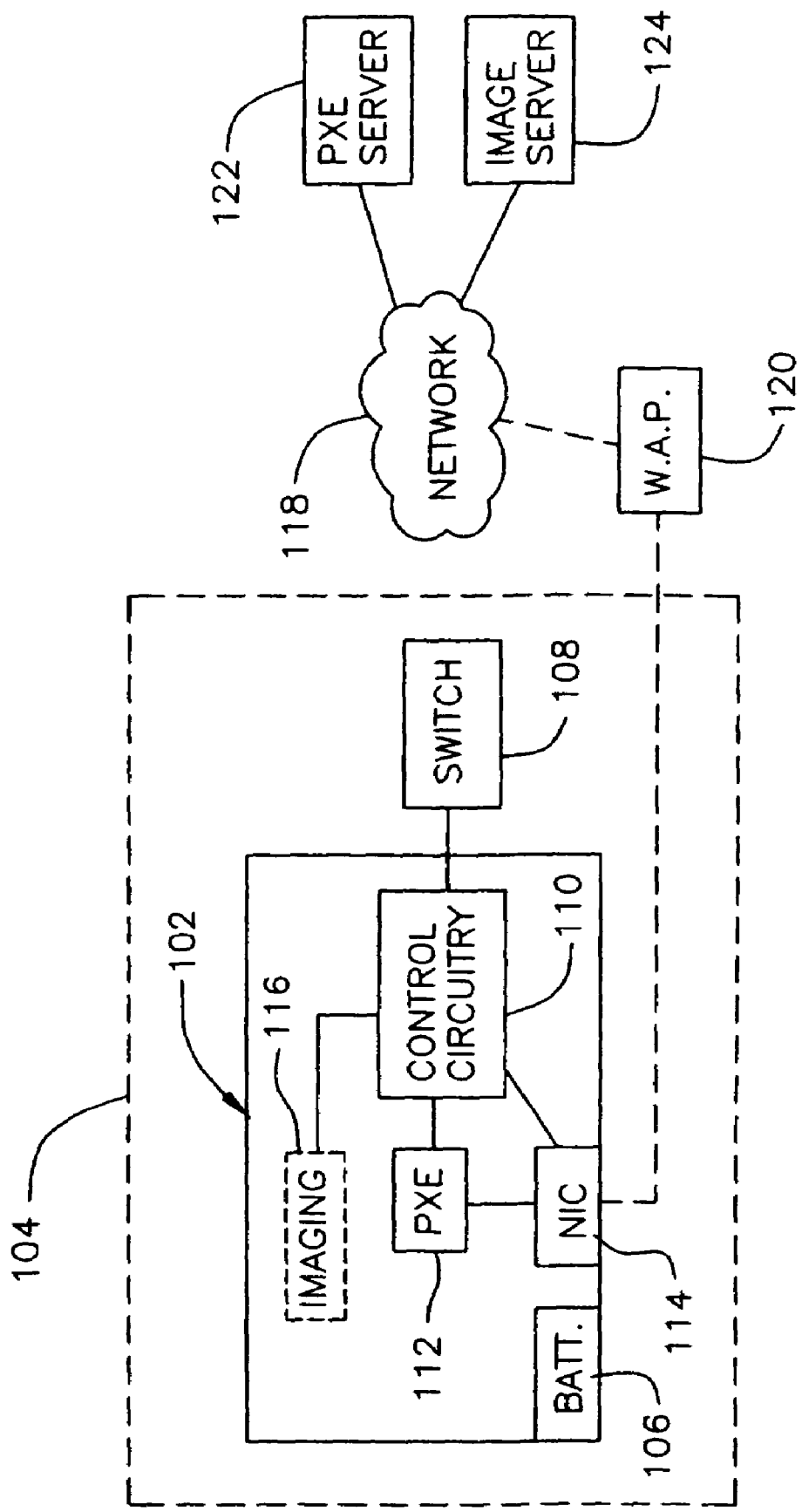
FIG. 1 schematically illustrates a laptop computer in a package, and a network with which it interfaces.

As shown in FIG. 1, a laptop computer 102 may be found in a carton 104 for delivery to a customer or to some other location. Computer 102 can preferably be powered by a battery 106. In accordance with a preferred embodiment of the present invention a position-sensitive switch 108 may be configured to power control circuitry 110 under given conditions, which in turn is configured to control a Pre-Boot Execution Environment (PXE) protocol 112 and a wireless network interface card (NIC) 114. (Standard PXE protocols are well known; for instance, INTEL has one that is very commonly used.) Though any of a wide variety of other media can be controlled by circuitry 110, an imaging arrangement 116 can preferably be so controlled.

Computer 102 can preferably access a wireless network 118 via a suitable wireless access point 120. Network 118 itself is preferably keyed in to a "home" PXE server 122 and another relevant server, such as image server 124, as known to those of ordinary skill in the art.

Imaging arrangement 116 will preferably be pre-configured to produce one or more graphical images on a screen (not shown), and this could be specific to the intended customer or other audience. However, it can often be the case that after a computer is packaged and ready for delivery, or has already been delivered, there might be a need to change the pre-configured image. Rather than unpacking and reconfiguring the computer 102, there is broadly contemplated herein, in accordance with at least one presently preferred embodiment of the present invention, an arrangement that permits the image (or even some other aspect of computer 102 or its operating system) to be changed without so much as unpacking the computer.

As shown, position-sensitive switch 108 could be activated in such a way as to prompt control circuitry 110 to "power on"

the computer 102 at least to the extent necessary to activate PXE protocol 112 and wireless NIC 114. (It should be understood that battery 106 will have been charged up sufficiently to permit such an operation.) By activating PXE protocol 112 and wireless NIC 114, the network 118 can be accessed through a wireless access point 120 to receive data relating to a new or updated image (or some other aspect of computer 102 or its operating system). By way of such access, PXE protocol 112 can be governed by PXE server 122 while a new or updated image can be retrieved from image server 124.

Though a wide variety of configurations are conceivable, in accordance with a particularly preferred embodiment of the present invention, switch 108 may be embodied by a mercury switch that activates upon the carton 104 (and thus computer 102) being tilted to or past a predetermined angle with respect to horizontal. For instance, this threshold angle could be 45 degrees. As such, the switch 108 can proceed to activate control circuitry 110 and other components in the manner described above. Thus, essentially, by merely tilting the carton 104, it will be possible for computer 102 to very easily receive updated data or information without having to unpack the computer 102.

Preferably, in connection with the operation just outlined, BIOS implemented in computer 102 will recognize that the operating system has only been enabled to the extent needed to carry out the tasks just described, thus prompting the wireless NIC 114 to be powered on and the PXE protocol 112 to be booted.

It should be understood that while the arrangement described above can preferably be employed to download new or updated imaging, other items may be downloaded as a result as well. For instance, a new or updated version of a device driver could be downloaded. Generally, the possible applications are wide and varied. For instance, if a customer refuses delivery of a computer or if the imaging or other aspect has been changed or updated in the interim, the actions described hereinabove can provide the greatly eased capability of incorporating such updates.

Preferably, control circuitry 110 will be deactivated after a predetermined period of time or responsive to a prompt, e.g., from the incoming data/information. This may or may not result in permanent disablement of the circuitry 110 (or, at least, until otherwise reactivated by the end user through in a predetermined manner), though clearly it would be desirable for a disablement mechanism to be involved (e.g., to avoid inadvertent re-activation of circuitry 110 when not needed). Thus, in a further refinement, switch 108 could be configured such that upon carton 104 and computer 102 being tilted to an even steeper angle than the initial "activation" angle (e.g., to 60 degrees from horizontal as opposed to 45 degrees), circuitry 110 will indeed be disabled until otherwise reactivated.

Switch 108 could be incorporated with computer 102 in essentially any suitable manner. Preferably, it may be embodied by a detachable component that is connected to the main body of computer 102, e.g., via a dedicated 2-pin connector. On the other hand, wireless NIC 114 can preferably be built into the computer while the dedicated control circuitry 110 can be included inside computer 102, e.g., by way of a detachable card.

It is to be understood that the present invention, in accordance with at least one presently preferred embodiment, includes a wireless interface, control circuitry and a switch, which may be implemented on at least one general-purpose computer running suitable software programs. It may also be implemented on at least one integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claim is:

1. An apparatus comprising:
an arrangement that updates at least one pre-configured aspect of a computer operating system of a packaged computer upon alteration of a positional state of said packaged computer, said arrangement further comprising:
  a position-sensitive switch, said position-sensitive switch being embodied in a component that is connected to a main body of said packaged computer via a dedicated connector, said position-sensitive switch being actuable upon an altered positional state of said packaged computer;
  a charged battery;
  a wireless interface; and
  control circuitry configured to:
    upon altering said positional state of said packaged computer and actuating said position-sensitive switch, power on said packaged computer utilizing said charged battery to an extent necessary to activate said wireless interface and a pre-boot execution protocol;
  wherein said pre-boot execution protocol comprises accessing at least one server via a wireless connection and downloading at least one aspect of a computer operating system; and
  whereby said at least one pre-configured aspect of said computer operating system is updated after altering said positional state of said packaged computer.

2. The apparatus according to claim 1, wherein said control circuitry is configured for updating imaging of the packaged computer upon actuation of said position-sensitive switch.

3. The apparatus according to claim 1, wherein said position-sensitive switch is actuable upon the packaged computer being tilted to a predetermined angle with respect to horizontal.

4. The apparatus according to claim 3, wherein the predetermined angle is at least about 45 degrees.

5. The apparatus according to claim 1, wherein said position-sensitive switch is further actuable to deactivate said control circuitry upon an altered positional state of the packaged computer.

6. The apparatus according to claim 5, wherein:
said position-sensitive switch is actuable to activate said control circuitry upon the packaged computer being tilted to a first predetermined angle with respect to horizontal; and
said position-sensitive switch is actuable to deactivate said control circuitry upon the packaged computer being tilted to a second predetermined angle with respect to horizontal, the second predetermined angle being greater than the first predetermined angle.

7. The apparatus according to claim 6, wherein the first predetermined angle is at least about 45 degrees and the second predetermined angle is at least about 60 degrees.

8. The apparatus according to claim 1, wherein said position-sensitive switch comprises a mercury switch.

9. The apparatus according to claim 1, wherein said wireless interface comprises a wireless NIC.

10. The apparatus according to claim 1, wherein the packaged computer is a laptop computer.

11. A method comprising the steps of:
    without unpacking a packaged computer, updating at least one pre-configured aspect of a computer operating system of said packaged computer upon alteration of a positional state of said packaged computer, said updating further comprising:
        providing a position-sensitive switch, said position-sensitive switch being embodied in a component that is connected to a main body of said packaged computer via a dedicated connector, said position-sensitive switch being actuable upon an altered positional state of said packaged computer;
        providing a charged battery;
        providing a wireless interface;
        providing control circuitry configured to:
            upon altering said positional state of said packaged computer and actuating said position-sensitive switch, power on said packaged computer utilizing said charged battery to an extent necessary to activate said wireless interface and a pre-boot execution protocol;
            wherein said pre-boot execution protocol comprises accessing at least one server via a wireless connection and downloading at least one aspect of a computer operating system; and
            whereby said at least one pre-configured aspect of a said computer operating system is updated after altering said positional state of said packaged computer.

12. The method according to claim 11, wherein said updating step comprises updating imaging of the packaged computer upon actuation of the position-sensitive switch.

13. The method according to claim 11, wherein said altering step comprises tilting the packaged computer to a predetermined angle with respect to horizontal.

14. The method according to claim 13, wherein the predetermined angle is at least about 45 degrees.

15. The method according to claim 11, wherein:
    said position-sensitive switch is further actuable to deactivate the control circuitry upon an altered positional state of the packaged computer; and
    said method further comprises further altering a positional state of the packaged computer and deactivating the control circuitry.

16. The method according to claim 15, wherein
    said step of altering comprises: tilting the packaged computer to a first predetermined angle with respect to horizontal; and
    tilting the packaged computer to a second predetermined angle with respect to horizontal, the second predetermined angle being greater than the first predetermined angle.

17. The method according to claim 11, wherein the position-sensitive switch comprises a mercury switch.

18. The method according to claim 11, wherein:
    the wireless interface comprises a wireless NIC; and
    the packaged computer is a laptop computer.

19. A program storage device readable by machine, tangibly embodying a program of instructions executable by the machine to perform method steps, said method comprising the steps of:
    without unpacking a packaged computer, updating at least one pre-configured aspect of a computer operating system of said packaged computer upon alteration of a positional state of said packaged computer, said updating further comprising:
        providing a position-sensitive switch, said position-sensitive switch being embodied in a component that is connected to a main body of said packaged computer via a dedicated connector, said position-sensitive switch being actuable upon an altered positional state of said packaged computer;
        providing a charged battery;
        providing a wireless interface;
        providing control circuitry configured to:
            upon altering said positional state of said packaged computer and actuating said position-sensitive switch, power on said packaged computer utilizing said charged battery to an extent necessary to activate said wireless interface and a pre-boot execution protocol;
            wherein said pre-boot execution protocol comprises accessing at least one server via a wireless connection and downloading at least one aspect of a computer operating system; and
        whereby said at least one pre-configured aspect of said computer operating system is updated after altering said positional state of said packaged computer.

* * * * *